Nov. 10, 1925.
F. STAUFFER
STANCHION
Filed May 9, 1925
1,561,123
Fig. 1.
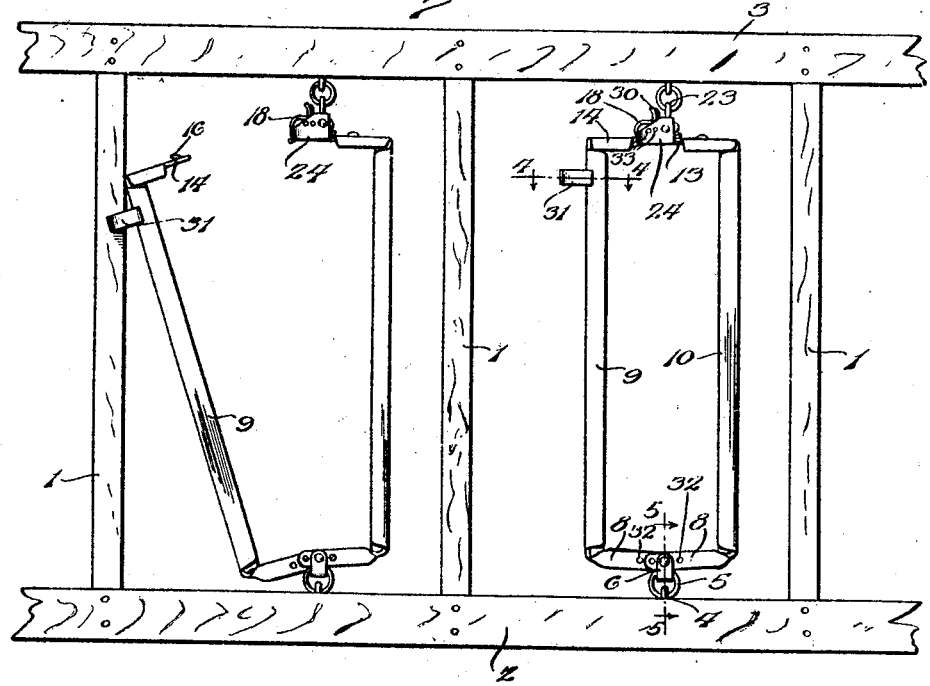
Fig. 2.
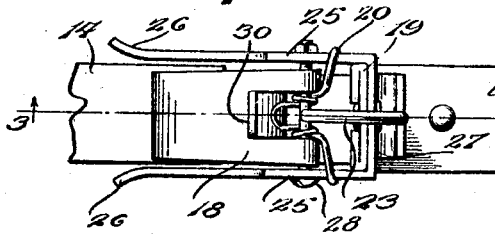
Fig. 4.
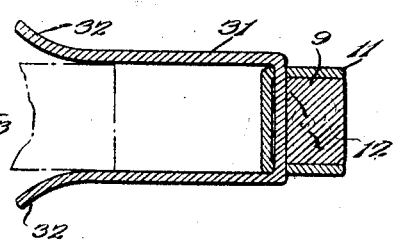
Fig. 3.
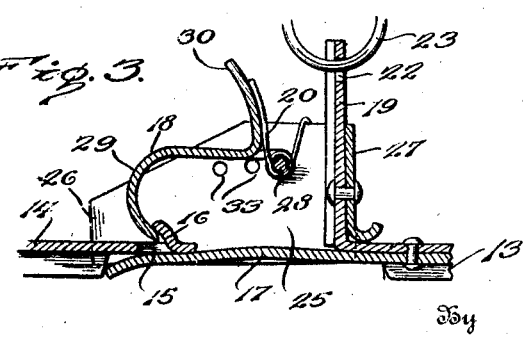
Fig. 5.
Inventor
F. Stauffer
By
Lacey Lacey, Attorney Patented Nov. 10, 1925.

1,561,123

UNITED STATES PATENT OFFICE.

FRED STAUFFER, OF MOUNT VERNON, MISSOURI.

STANCHION.

Application filed May 9, 1925. Serial No. 29,119.

*To all whom it may concern:*

Be it known that I, FRED STAUFFER, a citizen of the United States, residing at Mount Vernon, in the county of Lawrence and State of Missouri, have invented certain new and useful Improvements in Stanchions, of which the following is a specification.

This invention relates to stanchions and has for its object the provision of an inexpensive stanchion by the use of which cattle may be effectually retained in their stalls without discomfort to the animals. The invention seeks to provide a stanchion which may be adjusted to the size of the animal's neck within reasonable limits, and also seeks to provide a device in which the swinging member of the stanchion will be effectually held in open position when the animal is to be released. The invention also seeks to provide simple, inexpensive and efficient means for holding the members of the stanchion in locked position so that they may be easily separated by an operator but cannot be accidentally released by the movements of the animal. These several objects, and other objects which will incidentally hereinafter appear, are attained in such a device as is illustrated in the accompanying drawing, and the invention resides in certain novel features which will be particularly pointed out in the appended claims.

In the drawing:

Figure 1 is an elevation of my improved stanchion;
Fig. 2 is an enlarged top plan view of a portion of the upper end of the stanchion;

Fig. 3 is a section on the line 3—3 of Fig. 2;

Fig. 4 is an enlarged section on the line 4—4 of Fig. 1, and

Fig. 5 is an enlarged detail section on the line 5—5 of Fig. 1.

In the drawing, the reference numeral 1 indicates posts which may be of any desired dimensions and extend vertically between a lower frame bar 2 and an upper frame bar 3. The posts 1 are preferably alined with the side walls of the several stalls and the stanchions are mounted between each pair of posts and carried by the upper and lower frame bars, as shown and as will be understood. Secured in the lower frame bar 2 at the end of each stall is an eye or staple 4 which holds a ring 5 to the frame bar and engaged with the said eye is a clip 6. This clip is substantially U-shaped in cross section and through its ends is inserted a bolt 7 which pivotally receives the overlapping lower ends 8 of the side members of the stanchion. As shown, the stanchion comprises two side members 9 and 10 each of which consists of a channel bar 11 and a wood filler 12, as shown most clearly in Fig. 4, this construction providing strength and also avoiding the presentation of sharp edges to the neck of the animal so that no discomfort will be occasioned by the use of the device. The overlapping lower extremities 8 are integral extensions of the metal channel bar 11, and extensions 13 and 14 are provided at the upper ends of the side members of the stanchion. As shown most clearly in Fig. 3, the extension 14 has a portion thereof struck up transversely adjacent its end so as to form a slot 15 and an upstanding tongue 16 between the extremity of the member and the slot. The member 13 has secured to its extremity a leaf spring 17 adapted to extend under the free end of the member 14 so as to hold the tongue 16 in engagement with a latch 18 whereby the stanchion will be locked in closed position. The extremity of the extension 13 is upturned, as at 19, and in the upper extremity of the vertical member 19 is an opening 22 through which is engaged a ring 23 forming the lower end of a short chain which is attached to the upper frame bar 3, as will be understood upon reference to Fig. 1. A housing bracket or yoke 24 is secured to the upstanding member 19 and projects therefrom at the sides of the resilient tongue or leaf 17 so as to guide the same into proper engagement with the extension 14 and said housing or yoke comprises side plates 25 having their extremities 26 slightly diverging so that they will readily engage and pass at opposite sides of the member 14, said side plates being connected by a shoulder portion 27 which spans and is secured to the upstanding bracket member 19. This yoke 24 forms a carrier for the latch 18 which, as clearly shown, consists of a plate mounted at one end for rocking movement upon a bolt or pintle 28 extending between the side plates 25, the free end of the plate being curved downwardly to define a hook 29 adapted to engage under the tongue 16, as clearly shown in Fig. 3. A thumb piece or small handle 30 is formed upon the upper side of the plate 18 so that the latch may be opened when the separation of the stanchion members is desired, and a spring 20 is associated with the pintle 28 and has its ends bearing upon the thumb piece 30 and the yoke 25 so that its force is exerted to hold the latch in engagement with the keeper tongue 16.

The rocking side member 9 is equipped near its upper end with a clip 31 of resilient metal and substantially U-shaped with diverging extremities 32 whereby it may easily pass at opposite sides of the adjacent post 1. When the stanchion is opened, the clip 31 will engage the adjacent post 1, as shown in Fig. 1, and will, through its frictional engagement with the post, hold the stanchion member in the open position. When the stanchion is to be opened, a pressure by the thumb or fingers of the hand upon the thumb piece 30 will swing the hook 29 upwardly out of engagement with the keeper 16, whereupon the movable stanchion member may be easily rocked to the position shown at the left of Fig. 1. If the thumb piece be released, the hook will return to its lower position through the force of gravity and then, when the stanchion is to be again closed, the rocking member 9 is merely swung into the closed position, the latch riding automatically into engagement with the keeper 16 to lock the stanchion.

It will be readily seen from the foregoing description, taken in connection with the accompanying drawing, that I have provided a very simple structure which will effectually retain the animals in their stalls but which may be easily and quickly manipulated to release the animals when desired.

The overlapping lower ends 8 of the stanchion members are provided with a plurality of openings 32 so that the pivot bolt 7 may be inserted through any desired opening and thereby permit the stanchion to be readily adjusted to a thicker or a thinner neck, as may be necessary. For the same purpose, the latch carrier may be provided with a plurality of openings 33 in its sides so that the hinge pin or bolt 28 may be set through the proper openings to effect the same adjustment at the upper end of the stanchion as is effected at the lower end thereof.

Having thus described the invention, I claim:

1. A stanchion comprising a relatively stationary member, a relatively movable member, a spring tongue at the upper end of the stationary member adapted to project under the extremity of the movable member, an upstanding tongue on the movable member at the upper extremity thereof, and a latch carried by the stationary member and having a hooked free extremity to engage under said tongue.

2. A stanchion comprising a relatively stationary member, a relatively movable member, means for connecting the stationary member to a fixed frame, an upstanding tongue on the movable member at the upper end thereof, a yoke secured upon the stationary member at the upper end thereof to span the extremity of the movable member, a latch pivotally mounted between the sides of said yoke and adapted to engage the upstanding tongue on the movable member, and a resilient element on the stationary member adapted to engage under the upper extremity of the movable member.

In testimony whereof I affix my signature.

FRED STAUFFER. [L. S.]